United States Patent
Lee et al.

(10) Patent No.: US 10,324,331 B2
(45) Date of Patent: Jun. 18, 2019

(54) METHOD OF MANUFACTURING DISPLAY UNIT AND SYSTEM FOR LAMINATING OPTICAL FILM

(71) Applicant: LG CHEM, LTD., Seoul (KR)

(72) Inventors: Beom Seok Lee, Daejeon (KR); Kyung Hyeok Park, Daejeon (KR); Hang Suk Choi, Daejeon (KR); Eung Jin Jang, Daejeon (KR); Sukjae Lee, Daejeon (KR); Kyoung sik Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 218 days.

(21) Appl. No.: 15/303,070

(22) PCT Filed: Apr. 29, 2016

(86) PCT No.: PCT/KR2016/004499
§ 371 (c)(1),
(2) Date: Oct. 10, 2016

(87) PCT Pub. No.: WO2016/175598
PCT Pub. Date: Nov. 3, 2016

(65) Prior Publication Data
US 2017/0168348 A1 Jun. 15, 2017

(30) Foreign Application Priority Data

Apr. 30, 2015 (KR) .......................... 10-2015-0062061
Apr. 28, 2016 (KR) .......................... 10-2016-0052228

(51) Int. Cl.
*G02F 1/1335* (2006.01)
*G02F 1/13* (2006.01)
*B32B 38/18* (2006.01)
*B32B 37/22* (2006.01)
*B32B 38/10* (2006.01)

(52) U.S. Cl.
CPC .... *G02F 1/133528* (2013.01); *B32B 38/1808* (2013.01); *G02F 1/1303* (2013.01); *G02F 1/1335* (2013.01); *G02F 1/133504* (2013.01); *B32B 37/223* (2013.01); *B32B 38/10* (2013.01); *B32B 38/1816* (2013.01); *B32B 2457/202* (2013.01)

(58) Field of Classification Search
CPC .............. B32B 2457/202; B32B 38/10; B32B 38/1808; B32B 38/1816; B32B 37/223; G02F 1/1303; G02F 1/1335; G02F 1/133528; G02F 1/133504
See application file for complete search history.

(56) References Cited

U.S. PATENT DOCUMENTS

2014/0085723 A1* 3/2014 Hada .................... G02B 5/3033
359/489.11
2015/0246520 A1* 9/2015 Kim ........................ B32B 37/18
156/60

FOREIGN PATENT DOCUMENTS

JP 2003315545 A 11/2003
JP 2012198318 A 10/2012
(Continued)

OTHER PUBLICATIONS

Machine translation of JP 2012198318 A; Publication date: Oct. 18, 2012; Inventor: Koji Ueda.*

*Primary Examiner* — Vishal I Patel
(74) *Attorney, Agent, or Firm* — Dentons US LLP (57) ABSTRACT

The present specification relates to a display unit manufacturing method and an optical film laminating system.

10 Claims, 7 Drawing Sheets

(56) References Cited

FOREIGN PATENT DOCUMENTS

| KR | 1020110096766 A | 8/2011 | | |
|---|---|---|---|---|
| KR | 1020140051024 A | 4/2014 | | |
| KR | 101495763 B1 | 2/2015 | | |
| KR | 10201495763 A | 2/2015 | | |
| WO | WO-2015129954 A1 * | 9/2015 | ........... | G02F 1/1303 |

* cited by examiner

METHOD OF MANUFACTURING DISPLAY UNIT AND SYSTEM FOR LAMINATING OPTICAL FILM

TECHNICAL FIELD

This application is a National Stage Application of International Application No. PCT/KR2016/004499, filed Apr. 29, 2016, and claims the benefit of Korean Patent Application No. 10-2015-0062061, filed Apr. 30, 2015, and Korean Patent Application No. 10-2016-0052228, filed Apr. 28, 2016, the contents of which are incorporated herein by reference in their entirety for all purposes as if fully set forth below.

The present specification relates to a display unit manufacturing method and an optical film laminating system.

BACKGROUND ART

Recently, with remarkable development of information technology (IT) industries, industries associated with a liquid crystal display (LCD), which is one of the key components in the IT industries, have also been developed in order to use the LCD as a medium for transferring various types of information as the modern industrial society has been developed to a highly information-oriented society.

Figure 1:
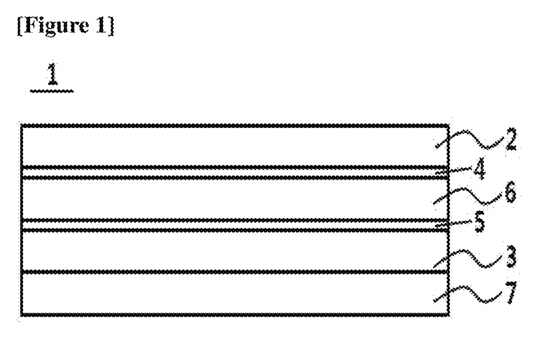
FIG. 1 illustrates a cross-sectional structure of a polarizing plate.

A polarizing plate is one of the important components for a flat panel display such as an LCD or organic EL. Specifically, a liquid crystal display panel has a configuration in which polarizing films are attached onto both surfaces of a liquid crystal cell. FIG. 1 schematically illustrates a typical shape of the polarizing plate. Referring to FIG. 1, a polarizing plate 1 includes a polarizing film 6 positioned at a center thereof, and protective films 2 and 3 attached onto both surfaces of the polarizing film 6 by means of adhesive layers 4 and 5. The protective films 2 and 3 are disposed at upper and lower sides of the polarizing film 6 and serve to prevent damage to the polarizing film 6.

DISCLOSURE

Technical Problem

The present specification has been made in an effort to provide a display unit manufacturing method and an optical film laminating system.

Technical Solution

The present specification provides a display unit manufacturing method including: preparing a panel unit having a light source side polarizing plate provided on one surface of a panel; and attaching an optical film onto the light source side polarizing plate by supplying the optical film onto the light source side polarizing plate from a roll around which the optical film is wound.

In addition, the present specification provides an optical film laminating system including: a panel conveying unit which conveys a panel in any one direction; a light source side polarizing plate forming unit which forms a light source side polarizing plate on one surface of the panel; a screen unit side polarizing plate forming unit which forms a screen unit side polarizing plate on the other surface of the panel so that a transmission axis of the light source side polarizing plate and a transmission axis of the screen unit side polarizing plate are perpendicular to each other; and an optical film forming unit which attaches an optical film onto the light source side polarizing plate, in which the optical film forming unit includes an optical film supply roll which supplies the optical film, a cutting means which cuts the optical film, and an optical film attaching means which presses and attaches the optical film onto the light source side polarizing plate.

Advantageous Effects

An advantage of the display unit manufacturing method according to the exemplary embodiment of the present specification is that a thin optical film may be easily attached onto the panel.

An advantage of the display unit manufactured by the display unit manufacturing method according to the exemplary embodiment of the present specification is that a loss of light is reduced, and thus brightness is improved.

An advantage of the display unit manufacturing method according to the exemplary embodiment of the present specification is that the process is simple, and thus the manufacturing time is reduced.

An advantage of the display unit manufacturing method according to the exemplary embodiment of the present specification is that the process is simple, a loss of raw materials of the optical film is reduced, and thus the manufacturing cost is reduced.

MODE FOR INVENTION

Hereinafter, the present specification will be described in detail.

The present specification provides a display unit manufacturing method including: preparing a panel unit having a light source side polarizing plate provided on one surface of a panel; and attaching an optical film onto the light source side polarizing plate by supplying the optical film onto the light source side polarizing plate from a roll around which the optical film is wound.

The display unit manufacturing method includes the preparing of the panel unit having the light source side polarizing plate provided on one surface of the panel.

The display unit manufacturing method may further include attaching a screen unit side polarizing plate onto a surface opposite to the surface of the panel on which the light source side polarizing plate is provided so that a transmission axis of the light source side polarizing plate and a transmission axis of the screen unit side polarizing plate are perpendicular to each other, before the preparing of the panel unit having the light source side polarizing plate, before the attaching of the optical film, or after the attaching of the optical film.

The display unit manufacturing method may include preparing a panel unit having a screen unit side polarizing plate provided on one surface of a panel, and a light source side polarizing plate provided on the other surface of the panel.

The preparing of the panel unit may include: forming the light source side polarizing plate on the other surface of the panel after forming the screen unit side polarizing plate on one surface of the panel; forming the screen unit side polarizing plate on the other surface of the panel after forming the light source side polarizing plate on one surface of the panel; or simultaneously forming the screen unit side polarizing plate and the light source side polarizing plate on one surface and the other surface of the panel.

The preparing of the panel unit may include attaching a plate-shaped polarizing plate onto one surface of the panel, or attaching a polarizing plate onto one surface of the panel by supplying the polarizing plate onto one surface of the panel from a roll around which the polarizing plate is wound.

The preparing of the panel unit may include attaching plate-shaped polarizing plates onto both surfaces of the panel, or attaching polarizing plates onto both surfaces of the panel by supplying the polarizing plate onto both surfaces of the panel from a roll around which the polarizing plate is wound.

The preparing of the panel unit may be attaching a polarizing plate onto one surface of the panel by supplying the polarizing plate onto one surface of the panel from a roll around which the polarizing plate is wound.

The preparing of the panel unit may be attaching polarizing plates onto both surfaces of the panel by supplying the polarizing plate onto both surfaces of the panel from a roll around which the polarizing plate is wound, or simultaneously attaching polarizing plates onto both surfaces of the panel by simultaneously supplying the polarizing plates onto one surface and the other surface of the panel from rolls around which the polarizing plates are wound. Specifically, the preparing of the panel unit may be attaching the polarizing plates onto both surfaces of the panel while or after supplying the polarizing plate onto both surfaces of the panel from the roll around which the polarizing plate is wound, or simultaneously attaching the polarizing plates onto both surfaces of the panel while or after simultaneously supplying the polarizing plates onto one surface and the other surface of the panel from the rolls around which the polarizing plates are wound.

The preparing of the panel unit may include: supplying the panel by conveying the panel in any one direction; and attaching the light source side polarizing plate onto one surface of the panel by supplying the light source side polarizing plate onto the panel from the roll around which the light source side polarizing plate is wound.

The preparing of the panel unit may include: supplying the panel by conveying the panel in any one direction; attaching the light source side polarizing plate onto one surface of the panel while or after supplying the light source side polarizing plate from the roll around which the light source side polarizing plate is wound; and attaching the screen unit side polarizing plate onto the other surface of the panel while or after supplying the screen unit side polarizing plate from the roll around which the screen unit side polarizing plate is wound, so that a transmission axis of the light source side polarizing plate and a transmission axis of the screen unit side polarizing plate are perpendicular to each other. As necessary, the attaching of the screen unit side polarizing plate onto one surface of the panel and the attaching of the light source side polarizing plate onto the other surface of the panel may be carried out at the same time.

The preparing of the panel unit may include: supplying the panel by conveying the panel in any one direction; attaching the screen unit side polarizing plate onto the one surface of the panel by pressing the screen unit side polarizing plate in a direction parallel to a conveying direction of the panel while or after supplying the polarizing plate in a direction parallel or perpendicular to the conveying direction of the panel from the roll around which the screen unit side polarizing plate is wound; and attaching the light source side polarizing plate onto the other surface of the panel by pressing the light source side polarizing plate in a direction parallel to the conveying direction of the panel while or after supplying the polarizing plate in a direction perpendicular to a supply direction of the screen unit side polarizing plate from the roll around which the light source side polarizing plate is wound.

Here, the polarizing plate wound around the roll is wound in a machine direction (MD), and the polarizing plate is extended in the machine direction, and as a result, the machine direction means a direction of an absorption axis of the polarizing plate.

According to the exemplary embodiment of the present specification, in a case in which the screen unit side polarizing plate is supplied in a direction parallel to the conveying direction of the panel from the roll around which the screen unit side polarizing plate is wound when the polarizing plate is supplied onto one surface of the panel, the screen unit side polarizing plate attached onto one surface of the panel has an absorption axis in a direction parallel to the conveying direction of the panel. In addition, an absorption axis of the light source side polarizing plate, which is attached onto the other surface of the panel by being supplied in a direction perpendicular to the supply direction of the screen unit side polarizing plate, may be perpendicular to the absorption axis of the screen unit side polarizing plate, and a transmission axis of a brightness enhancement film, which is attached onto the light source side polarizing plate by being supplied in a direction perpendicular to the supply direction of the light source side polarizing plate, may be perpendicular to the absorption axis of the light source side polarizing plate.

According to another exemplary embodiment of the present specification, in a case in which the screen unit side polarizing plate is supplied in a direction perpendicular to the conveying direction of the panel from the roll around which the screen unit side polarizing plate is wound when the polarizing plate is supplied onto one surface of the panel, the screen unit side polarizing plate attached onto one surface of the panel has an absorption axis in a direction perpendicular to the conveying direction of the panel. In addition, an absorption axis of the light source side polarizing plate, which is attached onto the other surface of the panel by being supplied in a direction perpendicular to the supply direction of the screen unit side polarizing plate, may be perpendicular to the absorption axis of the screen unit side polarizing plate, and a transmission axis of the brightness enhancement film, which is attached onto the light source side polarizing plate by being supplied in a direction perpendicular to the supply direction of the light source side polarizing plate, may be perpendicular to the absorption axis of the light source side polarizing plate.

The absorption axes of the two polarizing plates attached onto both surfaces of the panel are perpendicular to each other.

The transmission axis of the light source side polarizing plate and the transmission axis of the brightness enhancement film on the light source side polarizing plate are parallel to each other.

The preparing of the panel unit may further include cutting the light source side polarizing plate and the screen unit side polarizing plate to sizes corresponding to a size of the panel. In this case, the light source side polarizing plate and the screen unit side polarizing plate may be cut to have a length parallel to the conveying direction of the panel or a length perpendicular to the conveying direction of the panel in accordance with the supply directions of the light source side polarizing plate and the screen unit side polarizing plate.

In a case in which the light source side polarizing plate and the screen unit side polarizing plate include release paper provided on the surfaces thereof which come into contact with the panel, the preparing of the panel unit may further include: half-cutting the light source side polarizing plate and the screen unit side polarizing plate to sizes corresponding to the size of the panel; and removing the release paper from the light source side polarizing plate and the screen unit side polarizing plate.

The half-cutting may be carried out by cutting the polarizing plate except for the release paper without cutting the release paper, so that the polarizing plate may be continuously attached onto the panel. The method of performing the half-cutting is not particularly limited, and a method used in the art may be adopted. For example, the method of performing the half-cutting may be carried out by half-cutting the light source side polarizing plate and the screen unit side polarizing plate by using a knife or laser.

The preparing of the panel unit may include: half-cutting the polarizing plate before the polarizing plate unwound from the roll around which the polarizing plate is wound is supplied onto both surfaces of the panel; removing the release paper from the polarizing plate; and attaching the polarizing plate onto both surfaces of the panel by supplying the polarizing plate onto both surfaces of the panel.

The panel may be a liquid crystal panel which includes two substrates spaced apart from each other by a spacer, and liquid crystal provided between the two substrates.

The liquid crystal panel may further include color filters, thin film transistors and the like provided on opposite surfaces of the two substrates spaced apart from each other by the spacer. Specifically, the panel may include the color filter provided on one of the opposite surfaces of the two substrates spaced apart from each other by the spacer, and the thin film transistor provided on the other of the opposite surfaces, or the panel may include the thin film transistor provided on one of the opposite surfaces of the two substrates spaced apart from each other by the spacer, and the color filter provided on the thin film transistor.

In a case in which the panel includes the color filter provided on one of the opposite surfaces of the two substrates spaced apart from each other by the spacer, and the thin film transistor provided on the other of the opposite surfaces, the screen unit side polarizing plate may be provided on the other surface of the substrate provided with the color filter, and the light source side polarizing plate may be provided on the other surface of the substrate provided with the thin film transistor.

The panel may be a light emitting diode (LED) panel or an organic light emitting diode (OLED) panel.

The structure, the material, and the manufacturing method of the panel are not particularly limited, and the structure, the material, and the manufacturing method, which are typically used in the art, may be adopted.

Thicknesses of the light source side polarizing plate and the screen unit side polarizing plate are not particularly limited, but the thicknesses of the light source side polarizing plate and the screen unit side polarizing plate may be individually 300 μm or smaller, and the thickness of the polarizing plate is not particularly limited because the thickness of the polarizing plate tends to be decreased. For example, the thicknesses of the light source side polarizing plate and the screen unit side polarizing plate may be individually 50 μm or larger and 300 μm or smaller, and more particularly, 100 μm or larger and 250 μm or smaller.

Each of the light source side polarizing plate and the screen unit side polarizing plate may include a polarizing film, and protective films provided on both surfaces of the polarizing film.

As illustrated in FIG. 1, each of the light source side polarizing plate and the screen unit side polarizing plate may include a polarizing film 6, and protective films 2 and 3 provided on both surfaces of the polarizing film. Each of the light source side polarizing plate and the screen unit side polarizing plate 1 may include the polarizing film 6 at a center thereof, and adhesive layers 4 and 5 attached onto both surfaces of the polarizing film 6, and the polarizing plate 1 may be attached to the panel by means of a pressure sensitive adhesive 7.

One or more layers, among an anti-reflection layer, a low-reflection coating layer, an UV absorption layer, an antistatic coating layer, an antiglare layer, a liquid crystal coating layer, and a hard coating layer, may be additionally provided on the protective film of the screen unit side polarizing plate, as necessary.

One or more layers, among an anti-reflection layer, a low-reflection coating layer, an UV absorption layer, an antistatic coating layer, an antiglare layer, a liquid crystal coating layer, and a hard coating layer, may be additionally provided on the protective film of the light source side polarizing plate, as necessary.

The structure, the material, and the manufacturing method of the light source side polarizing plate and the screen unit side polarizing plate are not particularly limited, and the structure, the material, and the manufacturing method, which are typically used in the art, may be adopted.

The display unit manufacturing method includes attaching an optical film onto the light source side polarizing plate by supplying the optical film onto the light source side polarizing plate from a roll around which the optical film is wound.

The display unit manufacturing method includes attaching the optical film onto the light source side polarizing plate while or after supplying the optical film onto the light source side polarizing plate from the roll around which the optical film is wound.

The optical film is a film which is positioned between the light source side polarizing plate and a back light unit and improves efficiency of light generated by the back light unit or compensates for mechanical properties, and the optical film is attached onto the light source side polarizing plate so as to form a functional layer. The type and the laminating structure of the optical film are not particularly limited, and for example, one or more of one or more brightness enhancement films, one or more light collecting sheets, and one or more diffusion films may be provided between the light source side polarizing plate and the back light unit.

The attaching of the optical film may include attaching one or more optical films onto the light source side polarizing plate. Specifically, the attaching of the optical film may include attaching a single-layered or multi-layered optical film onto the polarizing plate.

The attaching of the optical film may include sequentially attaching two or more optical films onto the light source side polarizing plate.

The optical film may include the brightness enhancement film provided on the light source side polarizing plate.

The optical film may include the brightness enhancement film provided on the light source side polarizing plate, and the diffusion film provided on the brightness enhancement film.

The optical film may include the brightness enhancement film provided on the light source side polarizing plate, and the light collecting sheet provided on the brightness enhancement film.

As the optical film, one or more brightness enhancement films, one or more diffusion films, and one or more light collecting sheets may be sequentially, alternately, or randomly provided on the light source side polarizing plate. For example, as the optical film, the brightness enhancement film, the diffusion film, two sheets of light collecting sheets, and the diffusion film may be sequentially provided on the light source side polarizing plate.

Figure 3:
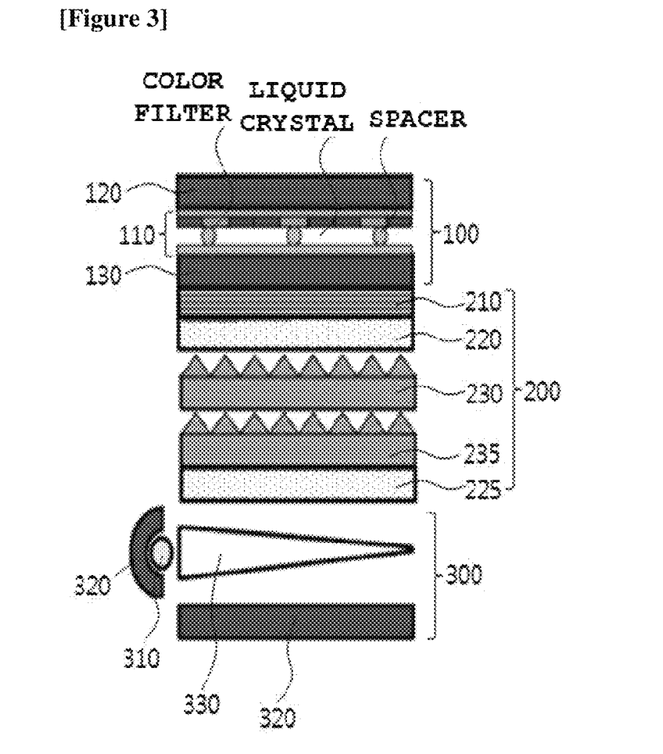
FIG. 3 illustrates a cross-sectional structure of a display unit according to another exemplary embodiment of the present specification.
Figure 4:
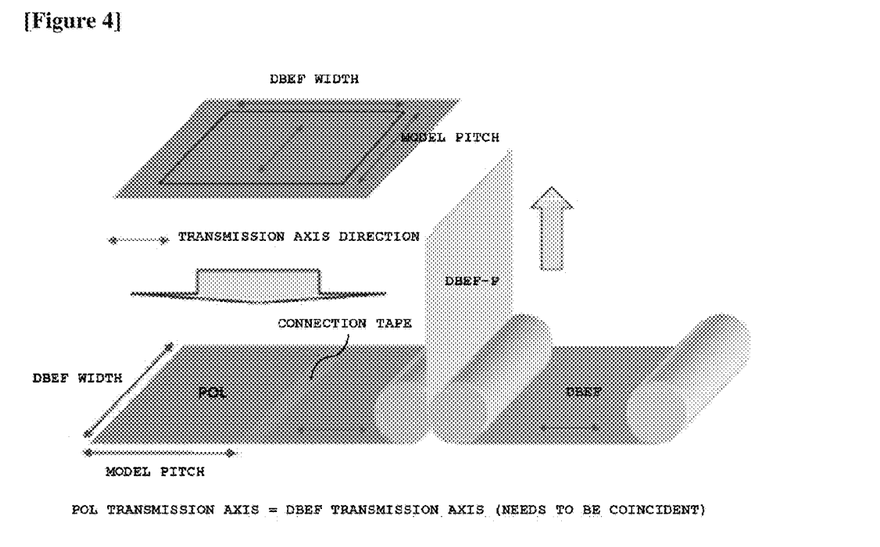
FIG. 4 illustrates a process of attaching a brightness enhancement film onto a polarizing plate through a roll-to-roll process.

As illustrated in FIG. 3, as an optical film 200, a brightness enhancement film 210, a diffusion film 220, two sheets of light collecting sheets 230 and 235, and a diffusion film 225 may be sequentially provided on a light source side polarizing plate 130.

The attaching of the optical film may include attaching the brightness enhancement film to the light source side polarizing plate by supplying the brightness enhancement film onto the light source side polarizing plate from a roll around which the brightness enhancement film is wound.

The attaching of the optical film may include: attaching the brightness enhancement film onto the light source side polarizing plate by supplying the brightness enhancement film onto the light source side polarizing plate from the roll around which the brightness enhancement film is wound so that a transmission axis of the light source side polarizing plate is parallel to a transmission axis of the brightness enhancement film; and attaching the light collecting sheet onto the brightness enhancement film by supplying the light collecting sheet onto the brightness enhancement film from a roll around which the light collecting sheet is wound.

The attaching of the optical film may include: attaching the brightness enhancement film onto the light source side polarizing plate by supplying the brightness enhancement film onto the light source side polarizing plate from the roll around which the brightness enhancement film is wound so that a transmission axis of the light source side polarizing plate is parallel to a transmission axis of the brightness enhancement film; and attaching the diffusion film onto the brightness enhancement film by supplying the diffusion film onto the brightness enhancement film from a roll around which the diffusion film is wound.

The attaching of the optical film may include: attaching the brightness enhancement film onto the light source side polarizing plate by supplying the brightness enhancement film onto the light source side polarizing plate from the roll around which the brightness enhancement film is wound so that the transmission axis of the light source side polarizing plate is parallel to the transmission axis of the brightness enhancement film; attaching the diffusion film onto the brightness enhancement film by supplying the diffusion film onto the brightness enhancement film from a roll around which the diffusion film is wound; and attaching the light collecting sheet onto the diffusion film by supplying the light collecting sheet onto the diffusion film from the roll around which the light collecting sheet is wound.

The attaching of the optical film may include attaching the optical film onto the light source side polarizing plate by supplying the optical film onto the light source side polarizing plate in a direction perpendicular to the supply direction of the light source side polarizing plate from the roll around which the optical film is wound.

The attaching of the optical film may include attaching the optical film onto the light source side polarizing plate by supplying the optical film onto the light source side polarizing plate in a direction perpendicular to the supply direction of the light source side polarizing plate from the roll around which the optical film is wound, and by pressing the optical film in a direction parallel to the conveying direction of the panel.

The attaching of the optical film may further include cutting the optical film to a size corresponding to the size of the panel. In this case, the optical film may be cut to have a length parallel to the conveying direction of the panel, or a length perpendicular to the conveying direction of the panel in accordance with the supply direction of the optical film.

In a case in which the optical film includes release paper provided on a surface thereof which comes into contact with the light source side polarizing plate, the attaching of the optical film may include: half-cutting the optical film to a size corresponding to the size of the panel; and removing the release paper from the optical film. In this case, the half-cutting may be carried out by cutting the optical film except for the release paper without cutting the release paper, so that the optical film may be continuously attached onto the light source side polarizing plate.

The attaching of the optical film may include: half-cutting the optical film before the optical film unwound from the roll around which the optical film is wound is supplied to the light source side polarizing plate; removing the release paper from the optical film; and attaching the optical film by supplying the optical film onto the light source side polarizing plate.

A thickness of the optical film, which is attached at a time, may be 1 μm or larger and 700 μm or smaller.

A thickness of the single-layered optical film, which is attached at a time, may be 1 μm or larger and 150 μm or smaller.

In a case in which the optical film is a single-layered brightness enhancement film, a thickness of the brightness enhancement film may be 1 μm or larger and 150 μm or smaller. Specifically, the thickness of the brightness enhancement film may be 1 μm or larger and 70 μm or smaller.

A thickness of the multi-layered optical film, which is attached at a time, may be 20 μm or larger and 700 μm or smaller.

In a case in which the multi-layered optical film includes the brightness enhancement film, and the diffusion film provided on the brightness enhancement film, a thickness of the multi-layered optical film may be 20 μm or larger and 700 μm or smaller. Specifically, the thickness of the multi-layered optical film may be 20 μm or larger and 200 μm or smaller.

In a case in which the panel is a liquid crystal panel, the method may further include providing a back light unit on the optical film after the attaching of the optical film.

The back light unit is a light source for a liquid crystal display, and the structure, and the material of the back light unit are not particularly limited, and the structure, and the material, which are typically used in the art, may be adopted. For example, the back light unit may use a bulb, a light emitting diode (LED), or an organic light emitting diode (OLED) as a light source, and may be further include at least one of a reflective plate and a light guide in order to ensure luminous efficiency.

The present specification provides an optical film laminating system including: a panel conveying unit which conveys a panel in any one direction; a light source side polarizing plate forming unit which forms a light source side polarizing plate on one surface of the panel; and a screen unit side polarizing plate forming unit which forms a screen unit side polarizing plate on the other surface of the panel so that a transmission axis of the light source side polarizing plate and a transmission axis of the screen unit side polarizing plate are perpendicular to each other; and an optical film forming unit which attaches an optical film onto the light source side polarizing plate, in which the optical film forming unit includes an optical film supply roll which supplies the optical film, a cutting means which cuts the optical film, and an optical film attaching means which presses and attaches the optical film onto the light source side polarizing plate.

Figure 5:
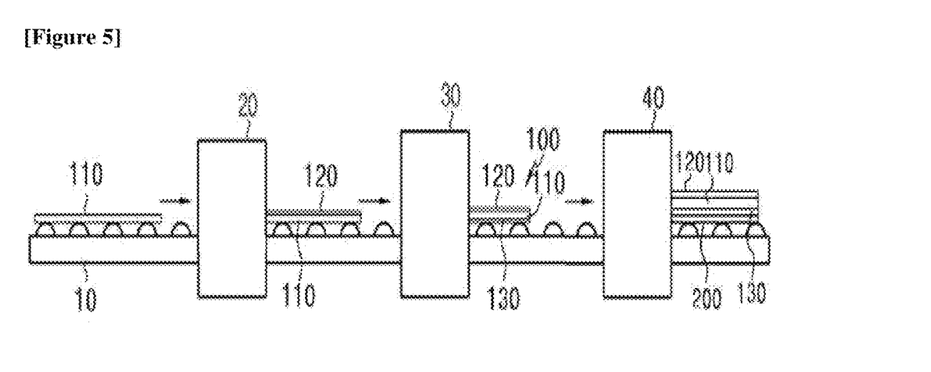
FIG. 5 is a conceptual view illustrating an optical film laminating system according to an exemplary embodiment of the present specification.

As illustrated in FIG. 5, the optical film laminating system according to the exemplary embodiment of the present specification may include: a panel conveying unit 10 which conveys a panel; a screen unit side polarizing plate forming unit 20 which forms a screen unit side polarizing plate 120 on one surface of the panel 110; a light source side polarizing plate forming unit 30 which forms a light source side polarizing plate 130 on the other surface of the panel; and an optical film forming unit 40 which attaches an optical film 200 onto the light source side polarizing plate 130.

The present specification provides an optical film laminating system including: a panel conveying unit which conveys a panel; a light source side polarizing plate forming unit which forms a light source side polarizing plate on one surface of the panel; and a screen unit side polarizing plate forming unit which forms a screen unit side polarizing plate on the other surface of the panel so that a transmission axis of the light source side polarizing plate and a transmission axis of the screen unit side polarizing plate are perpendicular to each other; and an optical film forming unit which attaches an optical film onto the light source side polarizing plate, in which the optical film forming unit includes an optical film supply roll which supplies the optical film, a cutting means which cuts the optical film, and an optical film attaching means which presses and attaches the optical film onto the light source side polarizing plate.

The aforementioned description of the display unit manufacturing method may be applied to the description of the optical film laminating system.

The panel conveying unit is a unit for conveying the panel, and may include a conveyor belt which supports and conveys the panel having a predetermined size, or a plurality of conveying rollers which supports and conveys the panel having a predetermined size while rotating.

If a length parallel to the conveying direction of the panel is defined as a length of the panel, and a length perpendicular to the conveying direction of the panel is defined as a width of the panel, the panel conveying unit may have a width equal to or greater than the width of the panel.

The light source side polarizing plate forming unit may include a polarizing plate conveying means which conveys a plate-shaped polarizing plate, and a polarizing plate attaching means which attaches the plate-shaped polarizing plate onto the panel.

The light source side polarizing plate forming unit may include a light source side polarizing plate supply roll which supplies the light source side polarizing plate, a cutting means which cuts the light source side polarizing plate, and a light source side polarizing plate attaching means which attaches the light source side polarizing plate onto one surface of the panel.

In a case in which the light source side polarizing plate includes release paper provided on a surface thereof which comes into contact with the panel, the cutting means may be a half-cutting means which cuts the light source side polarizing plate except for the release paper without cutting the release paper.

In a case in which the light source side polarizing plate includes release paper provided on a surface thereof which comes into contact with the panel, the light source side polarizing plate forming unit may include a release paper remover which is positioned between the light source side polarizing plate supply roll and the light source side polarizing plate attaching means and separates the release paper attached onto the light source side polarizing plate.

The light source side polarizing plate forming unit may include the light source side polarizing plate supply roll which supplies the light source side polarizing plate in a direction parallel or perpendicular to the conveying direction of the panel, the cutting means which cuts the light source side polarizing plate, and the light source side polarizing plate attaching means which attaches the light source side polarizing plate onto one surface of the panel by pressing the light source side polarizing plate in a direction parallel to the conveying direction of the panel.

The light source side polarizing plate forming unit may further include a direction change roll which changes the supply direction of the light source side polarizing plate so that the supply direction of the light source side polarizing plate is directed toward one surface of the panel.

The light source side polarizing plate attaching means may include a laminating roll, a laminating drum which is provided with a suction hole formed in an outer circumferential surface of the laminating drum, or a laminating drum which is provided with a suction pad positioned on an outer circumferential surface of the laminating drum.

In a case in which the light source side polarizing plate is supplied in a direction perpendicular to the conveying direction of the panel, the light source side polarizing plate attaching means may include the laminating drum which is provided with the suction hole formed in the outer circumferential surface of the laminating drum, or the laminating drum which is provided with the suction pad positioned on the outer circumferential surface of the laminating drum.

The screen unit side polarizing plate forming unit may include a polarizing plate conveying means which conveys a plate-shaped polarizing plate, and a polarizing plate attaching means which attaches the plate-shaped polarizing plate onto the panel.

The screen unit side polarizing plate forming unit may include a screen unit side polarizing plate supply roll which supplies the screen unit side polarizing plate, a cutting means which cuts the screen unit side polarizing plate, and a screen unit side polarizing plate attaching means which attaches the screen unit side polarizing plate onto the other surface of the panel.

In a case in which the screen unit side polarizing plate includes release paper provided on a surface thereof which comes into contact with the panel, the cutting means may be a half-cutting means which cuts the screen unit side polarizing plate except for the release paper without cutting the release paper.

In a case in which the screen unit side polarizing plate includes release paper provided on a surface thereof which comes into contact with the panel, the screen unit side polarizing plate forming unit may include a release paper remover which is positioned between the screen unit side polarizing plate supply roll and the screen unit side polarizing plate attaching means and separates the release paper attached onto the screen unit side polarizing plate.

The screen unit side polarizing plate forming unit may include the screen unit side polarizing plate supply roll which supplies the screen unit side polarizing plate, the cutting means which cuts the screen unit side polarizing plate, and the screen unit side polarizing plate attaching means which attaches the screen unit side polarizing plate onto the other surface of the panel by pressing the screen unit side polarizing plate in a direction parallel to the conveying direction of the panel so that a transmission axis of the light source side polarizing plate and a transmission axis of the screen unit side polarizing plate are perpendicular to each other.

The screen unit side polarizing plate forming unit may further include a direction change roll which changes the supply direction of the screen unit side polarizing plate so that the supply direction of the screen unit side polarizing plate is directed toward the other surface of the panel.

The screen unit side polarizing plate attaching means may include a laminating roll, a laminating drum which is provided with a suction hole formed in an outer circumferential surface of the laminating drum, or a laminating drum which is provided with a suction pad positioned on an outer circumferential surface of the laminating drum.

In a case in which the screen unit side polarizing plate is supplied in a direction perpendicular to the conveying direction of the panel, the screen unit side polarizing plate attaching means may include the laminating drum which is provided with the suction hole formed in the outer circumferential surface of the laminating drum, or the laminating drum which is provided with the suction pad positioned on the outer circumferential surface of the laminating drum.

The optical film forming unit may include the optical film supply roll which supplies the optical film, the cutting means which cuts the optical film, and the optical film attaching means which presses and attaches the optical film onto the light source side polarizing plate.

In a case in which the number of optical films to be attached onto the light source side polarizing film is two or more, the optical film forming unit may include two or more optical film forming units in accordance with the number of optical films.

In a case in which the optical film includes release paper provided on a surface thereof which comes into contact with the light source side polarizing plate, the cutting means may be a half-cutting means which cuts the optical film except for the release paper without cutting the release paper.

In a case in which the optical film includes release paper provided on a surface thereof which comes into contact with the panel, the optical film forming unit may include a release paper remover which is positioned between the optical film supply roll and the optical film attaching means and separates the release paper attached onto the optical film.

The optical film forming unit may include the optical film supply roll which supplies the optical film in a direction perpendicular to the supply direction of the light source side polarizing plate, the cutting means which cuts the optical film, and the optical film attaching means which attaches the optical film onto the light source side polarizing plate by pressing the optical film in a direction parallel to the conveying direction of the panel.

Figure 6:
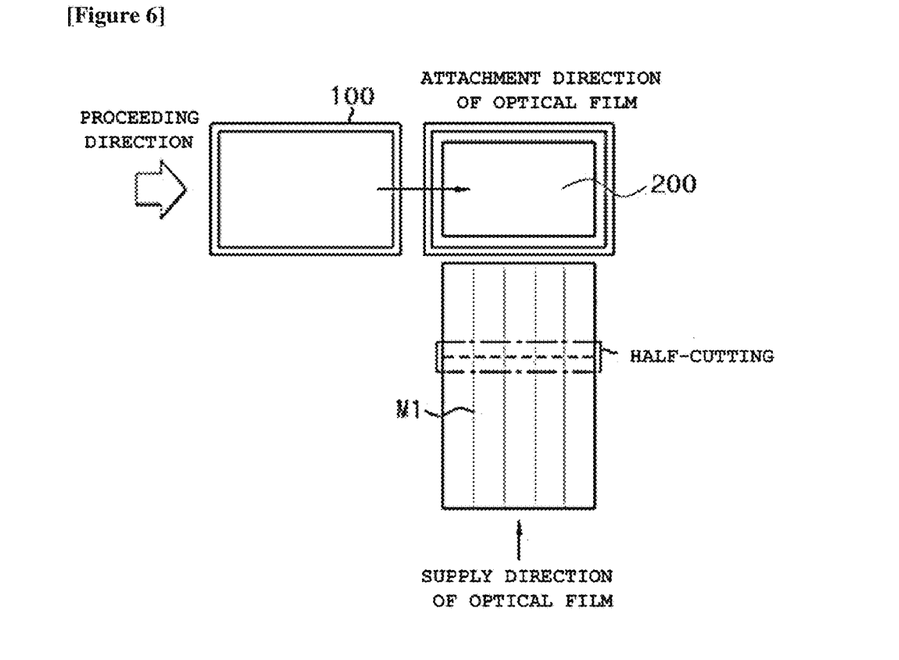
FIG. 6 is a top plan view of an optical film forming unit according to a first exemplary embodiment of the present specification.

In a case in which the transmission axis of the light source side polarizing plate is perpendicular to the proceeding direction of the panel unit 100, the optical film 200 may be attached onto the light source side polarizing plate by supplying the optical film in a direction perpendicular to the proceeding direction of the panel unit, as illustrated in FIG. 6. In this case, if the transmission axis of the optical film is present, the transmission axis of the optical film may be in a direction indicated by M1 illustrated in FIG. 6.

Figure 7:
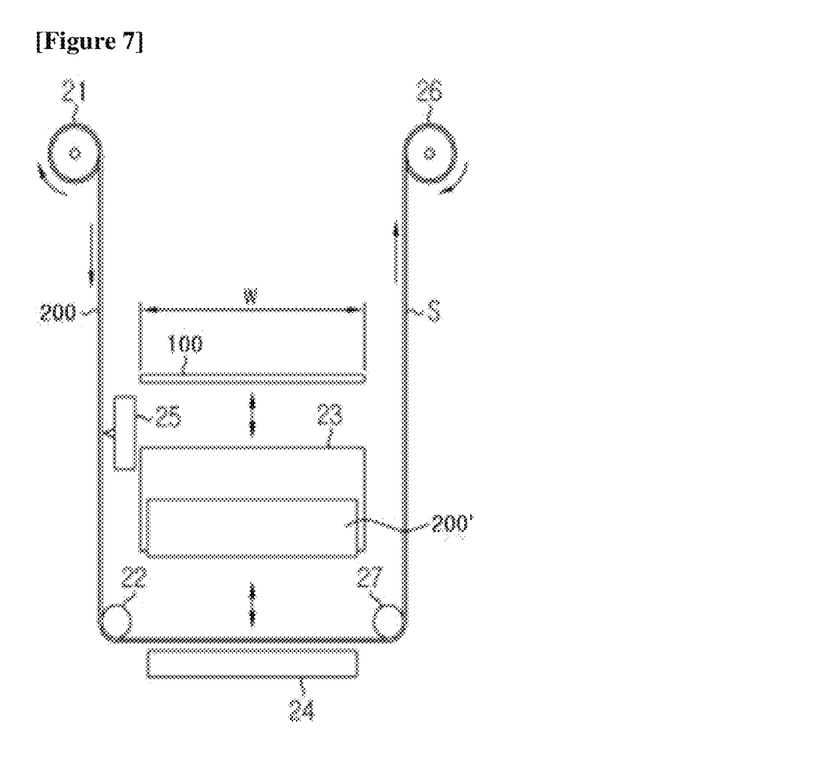
FIG. 7 is a cross-sectional view of the optical film forming unit according to the first exemplary embodiment of the present specification.
Figure 8:
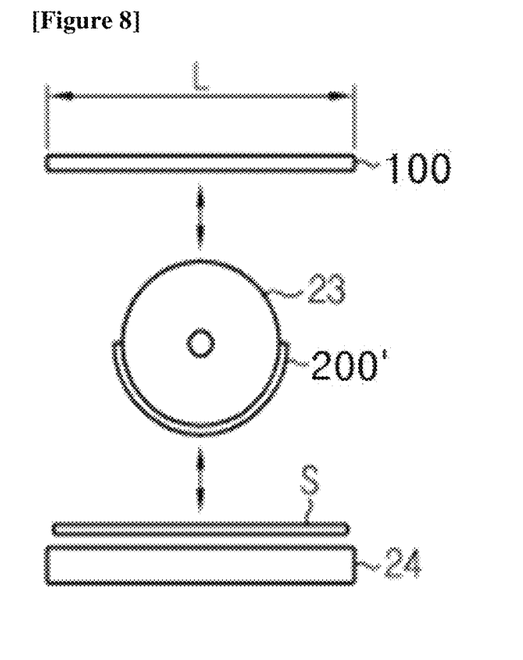
FIG. 8 is a cross-sectional view of the optical film forming unit when viewing the optical film forming unit rotated by 90° from the cross-sectional view of FIG. 7.

In a case in which the transmission axis of the light source side polarizing plate is in a direction perpendicular to the proceeding direction of the panel unit 100, the optical film forming unit may include an optical film supply roll 21 which supplies the optical film 200 in a direction perpendicular to the proceeding direction of the panel unit, a cutting means 25 which cuts the optical film, and a laminating drum 23 which is an optical film attaching means that attaches the optical film onto the light source side polarizing plate, as illustrated in FIGS. 7 and 8. As illustrated in FIGS. 7 and 8, the optical film forming unit may further include direction change rolls 22 and 27 which change the supply direction of the optical film so that the supply direction of the optical film is directed toward one surface of the light source side polarizing plate. In addition, as illustrated in FIGS. 7 and 8, the optical film forming unit half-cuts the optical film having the release paper, and then attaches an optical film 200', from which the release paper is removed, onto the light source side polarizing plate by using the laminating drum 23, and a removed release paper S may be collected by a release paper collecting roll 26.

Figure 9:
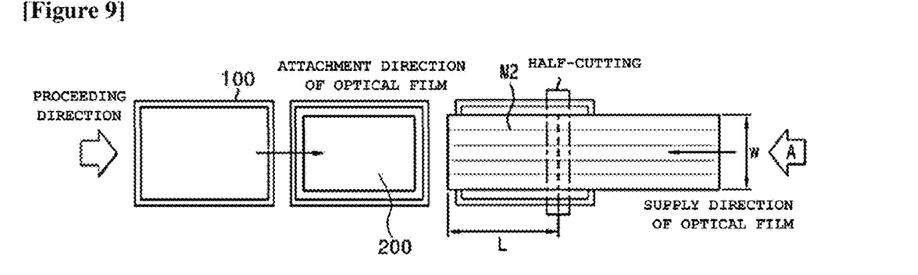
FIG. 9 is a top plan view of an optical film forming unit according to a second exemplary embodiment of the present specification.

In a case in which the transmission axis of the light source side polarizing plate is parallel to the proceeding direction of the panel unit 100, the optical film 200 may be attached onto the light source side polarizing plate by supplying the optical film in a direction parallel to the proceeding direction of the panel unit, as illustrated in FIG. 9. In this case, if the transmission axis of the optical film is present, the transmission axis of the optical film may be in a direction indicated by M2 illustrated in FIG. 9.

Figure 10:
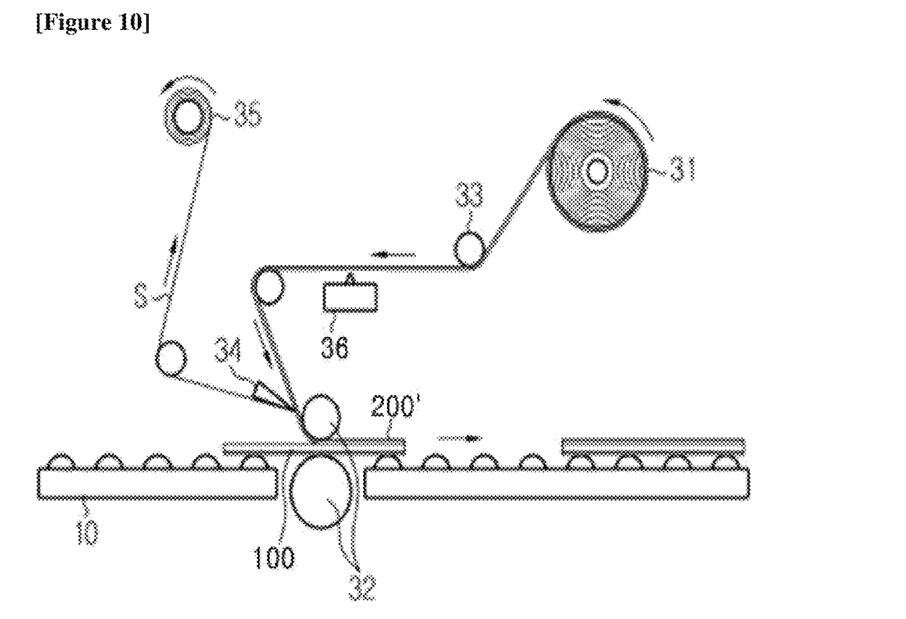
FIG. 10 is a cross-sectional view of the optical film forming unit according to the second exemplary embodiment of the present specification.

In a case in which the transmission axis of the light source side polarizing plate is in a direction parallel to the proceeding direction of the panel unit 100, the optical film forming unit may include an optical film supply roll 31 which supplies the optical film 200 in a direction parallel to the proceeding direction of the panel unit, a cutting means 36 which cuts the optical film, and laminating drums 32 which are optical film attaching means that attach the optical film onto the light source side polarizing plate, as illustrated in FIG. 10. As illustrated in FIG. 10, the optical film forming unit may further include a direction change roll 33 which changes the supply direction of the optical film so that the supply direction of the optical film is directed toward one surface of the light source side polarizing plate. In addition, as illustrated in FIG. 10, the optical film forming unit half-cuts the optical film having the release paper, and then attaches the optical film 200', from which the release paper is removed, onto the light source side polarizing plate by using the laminating drums 32, and the removed release paper S may be collected by a release paper collecting roll 35.

The optical film forming unit may further include the direction change roll which changes the supply direction of the optical film so that the supply direction of the optical film is directed toward one surface of the light source side polarizing plate.

The optical film attaching means may include a laminating roll, a laminating drum which is provided with a suction hole formed in an outer circumferential surface of the laminating drum, or a laminating drum which is provided with a suction pad positioned on an outer circumferential surface of the laminating drum.

In a case in which the optical film is supplied in a direction perpendicular to the conveying direction of the panel, the optical film attaching means may include the laminating drum which is provided with the suction hole formed in the outer circumferential surface of the laminating drum, or the laminating drum which is provided with the suction pad positioned on the outer circumferential surface of the laminating drum.

In a case in which the polarizing plate having the release paper attached onto one surface of the polarizing plate is supplied onto the panel by using the roll, the polarizing plate is cut to a size corresponding to the size of the panel, the polarizing plate is attached onto one surface of the panel while the release paper attached onto the polarizing plate is removed, and then the optical film is attached to the other surface of the panel through the same processes, a process of reversing the panel is required.

In addition, because the polarizing plate needs to be attached onto the other surface of the panel such that an absorption axis of the polarizing plate attached onto the other surface of the panel is perpendicular to an absorption axis of the polarizing plate attached onto one surface of the panel, a process of rotating the panel is also required. To perform the additional processes, devices for rotating the panel or the optical film needs to be added, and the addition of the devices causes an increase in length of process lines, and as a result, there is a problem in that spatial efficiency deteriorates.

Meanwhile, an advantage of the display unit manufacturing method according to the present specification is that no process of reversing or rotating the panel is required when the polarizing plates are attached onto both surfaces of the panel, and as a result, the process is simplified, manufacturing time is reduced, and spatial efficiency is improved.

The functional layers such as the light collecting sheet, the light diffusion layer, and the brightness enhancement layer may be provided between the light source side polarizing plate and the back light unit in order to efficiently use light generated by the back light unit.

The functional layers such as the light collecting sheet, the light diffusion layer, and the brightness enhancement layer, which are provided between the light source side polarizing plate and the back light unit, are provided to be spaced apart from each other, and as a result, a loss of light occurs due to a difference in refractive index between air and the functional layers.

Therefore, the functional layers, which are provided between the light source side polarizing plate and the back light unit, are attached onto the light source side polarizing plate, and as a result, an interface with air is reduced, thereby reducing a loss of light caused by a difference in refractive index between air and the functional layers.

In a case in which the brightness enhancement film, which is provided between the light source side polarizing plate and the back light unit, is attached onto the light source side polarizing plate, the absorption axis of the light source side polarizing plate needs to be perpendicular to the transmission axis of the brightness enhancement film provided between the light source side polarizing plate and the back light unit.

Figure 2:
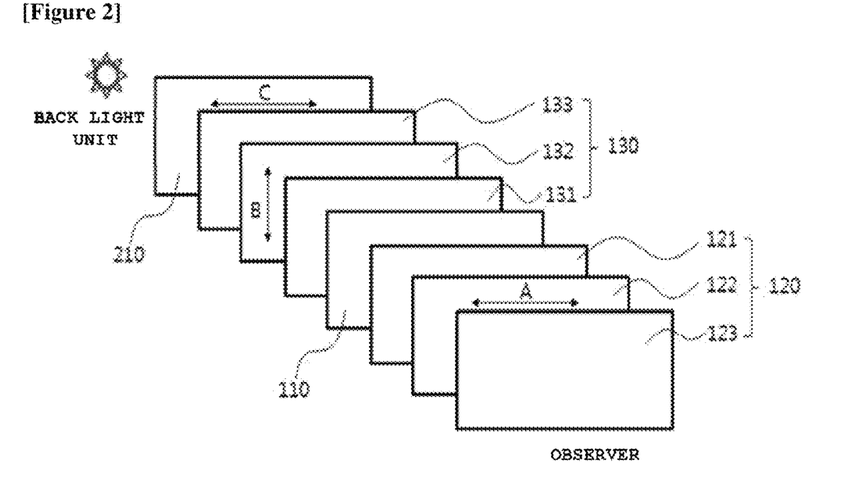
FIG. 2 illustrates an exploded perspective view of a display unit according to an exemplary embodiment of the present specification.

As illustrated in FIG. 2, in a case in which the brightness enhancement film 210, which is provided between the light source side polarizing plate 130 and the back light unit, is attached onto the light source side polarizing plate 130, an absorption axis B of the light source side polarizing plate needs to be perpendicular to a transmission axis C of the brightness enhancement film provided between the light source side polarizing plate and the back light unit.

Because a machine direction of the light source side polarizing plate is the absorption axis direction, and a machine direction of the brightness enhancement film is a transmission axis direction, in order to manufacture a laminated film through a roll-to-roll process by using the roll around which the light source side polarizing plate is wound and the roll around which the brightness enhancement film is wound, the plurality of polarizing plates, which is made by cutting the polarizing plate to a size corresponding to the size of the panel and then rotating the cut polarizing plates by 90°, is connected by tape and then wound around the roll so that the absorption axes of the plurality of polarizing plates are parallel to each other, and thus the laminated film may be manufactured through the roll-to-roll process by using the roll around which the brightness enhancement film is wound and the roll around which the plurality of polarizing plates is wound such that the absorption axes of the plurality of polarizing plates are parallel to each other.

However, in this case, there is a disadvantage in that additional processes of cutting and rotating the polarizing plate and connecting the polarizing plates by using the tape are required. In addition, because connecting portions where the plurality of polarizing plates are connected by the tape need to be removed after a dual film to which the brightness enhancement film is attached is manufactured, there is a disadvantage in that raw materials of the polarizing plate are lost.

Meanwhile, the display unit manufacturing method according to the present specification may reduce a loss of raw materials of the polarizing plate and the brightness enhancement film without reversing or rotating the panel when attaching an optical functional film, such as the brightness enhancement film, onto the light source side polarizing plate attached onto the panel.

In a case in which the light source side polarizing plate and the brightness enhancement film are directly attached, the respective transmission axes need to be parallel to each other, and in a case in which a phase difference film is added between the light source side polarizing plate and the brightness enhancement film, a multi-layered film may be manufactured through the roll-to-roll process without cutting the light source side polarizing plate, but because the phase difference film needs to be additionally provided, there is a problem in that manufacturing cost is increased.

Meanwhile, an advantage of the display unit manufacturing method according to the present specification is that even in a case in which the phase difference film is not additionally provided between the light source side polarizing plate and the brightness enhancement film, the process of attaching the brightness enhancement film onto the light source side polarizing plate is simple, a loss of raw materials of the optical film is reduced, and thus manufacturing cost is reduced.

EXPLANATION OF REFERENCE NUMERALS AND SYMBOLS

1: Polarizing plate
2, 3: Protective film
4, 5: Adhesive layer
6: Polarizing film
7: Pressure sensitive adhesive
10: Panel conveying unit
20: Screen unit side polarizing plate forming unit
30: Light source side polarizing plate forming unit
40: Optical film forming unit
100: Panel unit
110: Panel
120: Screen unit side polarizing plate
121: Inner protective film
122: Polarizing film
123: Outer Protective Film
130: Light source side polarizing plate
131: Inner protective film
132: Polarizing film
133: Outer Protective Film
200: Optical film
210: Brightness enhancement film
220, 225: Diffusion film
230, 235: Light collecting sheet
300: Back light unit
310: Light source
320: Reflective plate
330: Light guide
A: Absorption axis direction of polarizing film of screen unit side polarizing plate
B: Absorption axis direction of polarizing film of light source side polarizing plate
C: Transmission axis direction of brightness enhancement film provided on light source side polarizing plate
21: Optical film supply roll
22, 27: Direction change roll
23: Laminating drum
24: Film holder
25: Cutting means
26: Release paper collecting roll
S: Release paper
31: Optical film supply roll
32: Laminating drum
33: Direction change roll
34: Release paper remover
35: Release paper collecting roll
36: Cutting means
TFT Pol: Light source side polarizing plate
POL: Polarizing plate
DBEF: Brightness enhancement film
DBEF-P: Brightness enhancement film onto which light source side polarizing plate is attached

The invention claimed is:

1. A method of manufacturing a display unit, the method comprising:
preparing a panel unit having a light source side polarizing plate provided on one surface of a panel;
sequentially attaching two or more optical films onto the light source side polarizing plate by supplying each optical film onto the light source side polarizing plate from a roll around which that optical film is wound; and
attaching a screen unit side polarizing plate to a surface of the panel, which is opposite to the surface of the panel on which the light source side polarizing plate is provided, so that a transmission axis of the light source side polarizing plate and a transmission axis of the screen unit side polarizing plate are perpendicular to each other, before the preparing of the panel unit having the light source side polarizing plate, before the attaching of the two or more optical films, or after the attaching of the two or more optical films.

2. The method of claim 1, wherein the two or more optical films include at least one of a brightness enhancement film, a light collecting sheet, and a diffusion film.

3. The method of claim 1, wherein the attaching of the two or more optical films includes attaching a brightness enhancement film onto the light source side polarizing plate by supplying the brightness enhancement film onto the light source side polarizing plate from a roll around which the brightness enhancement film is wound so that a transmission axis of the light source side polarizing plate and a transmission axis of the brightness enhancement film are parallel to each other.

4. The method of claim 1, wherein the attaching of the two or more optical films includes: attaching a brightness enhancement film onto the light source side polarizing plate by supplying the brightness enhancement film onto the light source side polarizing plate from a roll around which the brightness enhancement film is wound so that a transmission axis of the light source side polarizing plate and a transmission axis of the brightness enhancement film are parallel to each other; and attaching a light collecting sheet onto the brightness enhancement film by supplying the light collecting sheet onto the brightness enhancement film from a roll around which the light collecting sheet is wound.

5. The method of claim 1, further comprising:
providing a light source on the two or more optical films after the attaching of the two or more optical films.

6. The method of claim 1, wherein the preparing of the panel unit includes attaching a plate-shaped polarizing plate onto one surface of the panel, or attaching a polarizing plate onto one surface of the panel by supplying the polarizing plate onto one surface of the panel from a roll around which the polarizing plate is wound.

7. The method of claim 1, wherein the preparing of the panel unit includes:
supplying the panel by conveying the panel in any one direction; and
attaching the light source side polarizing plate onto one surface of the panel by supplying the light source side polarizing plate onto the panel from a roll around which the light source side polarizing plate is wound.

8. The method of claim 1, comprising:
supplying the panel by conveying the panel in any one direction;
attaching the light source side polarizing plate onto one surface of the panel by supplying the light source side polarizing plate from a roll around which the light source side polarizing plate is wound; and attaching a screen unit side polarizing plate onto the other surface of the panel by supplying the screen unit side polarizing plate from a roll around which the screen unit side polarizing plate is wound so that a transmission axis of the light source side polarizing plate and a transmission axis of the screen unit side polarizing plate are perpendicular to each other.

9. The method of claim 8, wherein the attaching of the two or more optical films includes attaching a brightness enhancement film onto the light source side polarizing plate by supplying the brightness enhancement film onto the light source side polarizing plate from a roll around which the brightness enhancement film is wound so that the transmission axis of the light source side polarizing plate and a transmission axis of the brightness enhancement film are parallel to each other.

10. The method of claim 1, wherein a total thickness of the two or more optical films is 20 µm or larger and 700 µm or smaller.

* * * * *